March 12, 1957 H. H. BALY 2,785,272
STEAM GENERATOR
Filed April 25, 1955
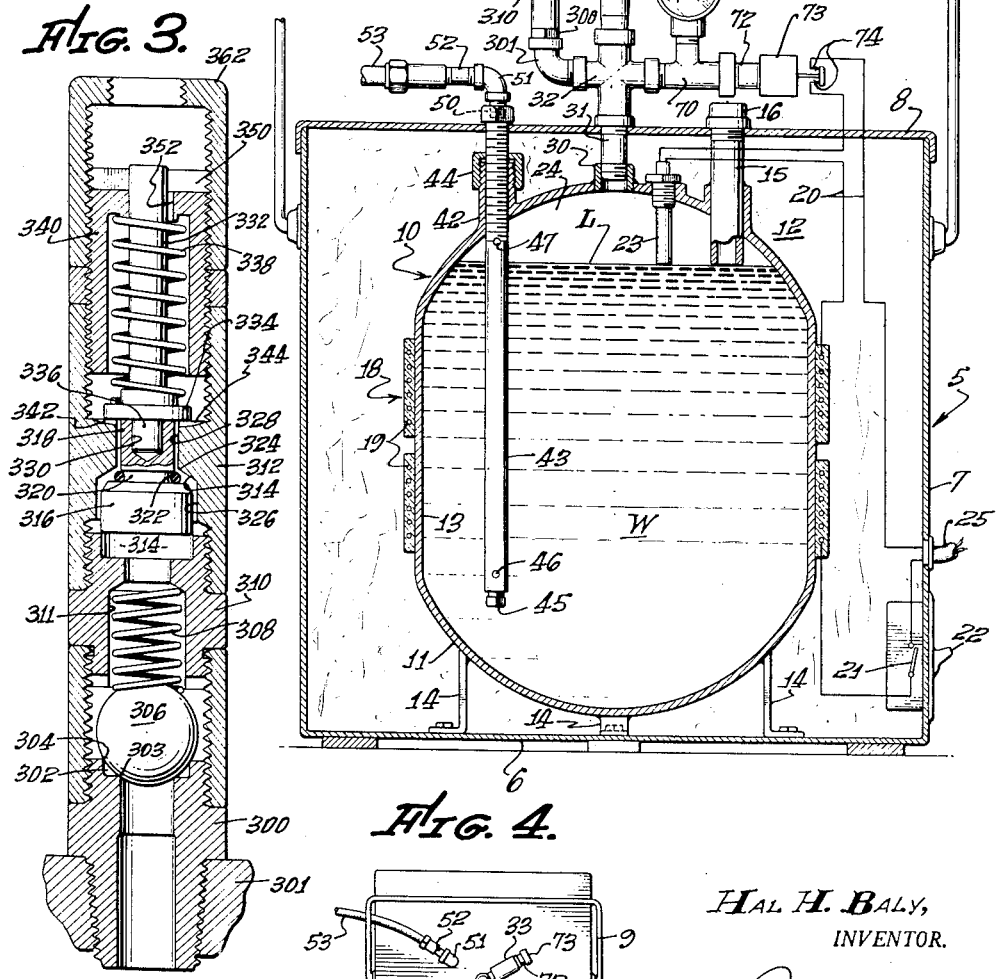
HAL H. BALY, INVENTOR.
BY *Reed C. Lawlor*
ATTORNEY.

United States Patent Office 2,785,272
Patented Mar. 12, 1957

2,785,272

STEAM GENERATOR

Hal H. Baly, Manhattan Beach, Calif.

Application April 25, 1955, Serial No. 503,631

8 Claims. (Cl. 219—38)

This invention relates generally to steam generators and particularly to a generator of the type commonly employed for supplying steam for cleaning purposes.

One object of the invention is to provide a steam generator of relatively small size, which is simple in construction, yet highly practical and having a plurality of safety features insuring the safety of its operation and efficient in performing its function.

Another object of the invention is to provide an improved steam generator which is capable of producing steam at a rapid rate and is also capable of maintaining and supplying the produced steam at a substantially constant pressure.

Another object of this invention is to provide a steam generator having a boiler, an electric heater surrounding the boiler, a pressure switch connected to the boiler and being responsive to the pressure within the boiler, and an electric switch connected in series with the heater for opening the circuits of said heater at a predetermined maximum pressure and for reclosing it at a lower pressure.

Another object of the invention is to provide an improved steam generator having a closed vessel or boiler for containing a supply of water to be boiled, a heating means surrounding the vessel to heat the water, a discharge pipe through which the generated steam flows to a dispensing nozzle, a safety poppet valve, a thermostatically and pressure-controlled electrical heater element, and a valve for discharging the air originally trapped in the boiler of the generator at the time the boiler is filled with water.

Another object of the invention is to provide a steam generator in which the heating means consists of an electrical heating element, the operation of which is controlled by a thermostat unit located within the upper portion of the vessel to be responsive to changes in the temperature of the steam vapor, or air, above the surface of the water, and is also controlled by the steam, or gas, pressure within the vessel.

A further object of the invention is to provide a steam generator, of the character referred to, having a boiler provided with a poppet type safety valve and a vent valve, the former being adapted to open at a relatively high pressure and the latter at a relatively low pressure and to close thereafter at a slightly higher pressure so that the air initially trapped in the upper part of the boiler is expelled from the vapor space when steam is generated initially so that steam having a substantially uniform temperature and degree of saturation is available for use at all times regardless of the number of times that steam has been dispersed through the spray nozzle.

Further objects of the invention will appear from the following description and from the drawing, which is intended for the purpose of illustration only, and in which:

Figure 1 is a side elevational view of the improved steam generator, showing it applied to use in supplying steam to a spray nozzle;

Fig. 2 is an enlarged vertical sectional view through the steam generator;

Fig. 3 is a vertical, longitudinal sectional view of the vent valve; and

Fig. 4 is a top plan view of the improved steam generator.

Referring to the drawing in detail, my improved steam generator includes a case or jacket 5 of square horizontal cross-section having a bottom wall 6, a side wall 7, and an upper wall or cover 8. A bail or handle 9 is pivoted to opposite sides of the jacket 5 to facilitate carrying the generator to desired locations.

A closed vessel or boiler 10 is disposed within the jacket 5, the boiler having a hemispherical bottom portion 11, an upper hemispherical portion 12, and a cylindrical intermediate portion 13. The lower portion 11 is provided with feet 14 which are bolted to the bottom wall 6 of the jacket 5 to mount the vessel. The space occurring between the jacket 5 and vessel 10 is packed with a suitable thermal insulation material 12.

The boiler 10 is adapted to contain a quantity of water W which is introduced thereinto by way of a filler tube 15 having its lower end disposed within the vessel and its upper end located above the top 8 of the jacket or case 5 and provided with a removable cap 16. The lower end of the tube 15 is so located vertically that it limits the filling of the boiler to the level indicated at L. To be more specific, during the filling operation, the water level rises to eventually cause the water to seal off the lower end of the tube to trap air in the upper closed end of the boiler. Since the trapped air cannot be displaced, the introduction of additional water is impossible and overfilling of the boiler above the indicated level L is prevented.

The water W within boiler 10 is heated to the temperature required to produce steam through the medium of heating means 18 which consists of electrical heating elements 19 surrounding the vessel. The heating elements 19 are connected in an electrical circuit 20 which includes a switch 21 having an actuator in the form of a pivoted arm 22 projecting through the case 5. Also connected in the circuit 20 is a thermostat element 23 which extends downwardly into the upper portion 24 of the vessel 10, this portion being hereinafter referred to as the vapor chamber. This vapor chamber is also connected through a threaded boss 30 at the top of the boiler 10, nipple 31, an X-fitting 32, a T-fitting 70, and a nipple 72 to pressure switch 73. The pressure switch 73 is provided with electrical contacts 74 which are normally connected in series with the heater circuit 20. This pressure switch opens circuit 20 when the pressure in boiler 10 exceeds a predetermined amount, such as 95 pounds per square inch. As will be noted by reference to Fig. 2, the thermostat element 23, heating elements 19, contacts 74, and switch 21 are connected in series in the circuit 20 which also includes a two-wire cable 25 provided with a plug element 26 by which the circuit can be connected to a source of electric current at a convenience outlet.

Connected to one lateral branch of the X-fitting 32 is a pressure gauge 33. A vent valve 35 is connected to the other lateral branch of the fitting 32. Screwed into the upper branch of the fitting is a safety valve 36 of the common poppet type. Since the valve 36 is conventional, it is not shown in detail. The vent valve 35 which is also shown in Fig. 3 and will be described more fully in connection with that figure, is set first to open when the pressure within boiler rises to a relatively low pressure of approximately 6 lbs. per square inch. It remains open until the pressure increases to a relatively high value of 14 lbs. per square inch at which pressure it closes again. The safety valve 36 is set to open when the pressure increases to approximately 100 lbs. per square inch, which is slightly higher than the pressure at which pressure switch 73 opens.

Screwed downwardly through a threaded boss 42 at the upper end of the boiler 10 is a standpipe, or discharge pipe, 43. A packing gland means 44 is employed for sealing the joint at the boss. The lower end of the pipe 43, which is closed by a plug 45, is located adjacent the lower end of the vessel. The pipe 43 is provided with small holes 46 and 47 located respectively adjacent its lower end and at a level immediately above the level L of the water.

A nipple 50 is screwed into the upper exposed end of the discharge pipe 43 and carries an L-fitting 51 to which a lateral nipple 52 is connected. One end fitting of a hose 53 is connected to the nipple 52. At its opposite end, the hose 53 carries a control valve 54 and a spray nozzle 55, these parts being of conventional types.

Referring now to Fig. 3, it illustrates a vertical cross-sectional view of the vent valve 35. This valve includes a threaded nipple 300 screwed into an elbow 301 which connects the valve to the boiler 10. The upper end of the nipple is provided with a recess 302 forming two sharp corners 303 and 304. The lower corner 303 is used as a seat for a stainless steel ball 306 which is held against seat 303 by a spring 308 mounted in a cylindrical recess of a nipple 310. The diameter of a bore 311 and the strength of spring 308 are so proportioned that ball 306 is raised off its seat 303 when the gas pressure within bore 311 rises to approximately 6 lbs. per square inch. Nipple 310 is threadedly connected to a nipple 312 which is provided with a cylindrical chamber 314 for housing a cylinder 316 having a cylindrical stem 318 and a ring-shaped groove 320. Groove 320 is provided with an O ring 322 which seats itself against a corner-shaped seat 324.

The stem 318 is guided in its up and down travel by cylindrical walls 326 and 328 provided in the nipple 312. The stem 318 is provided with a bore 330 at its upper end, which bore is used for aligning and holding an upper stem 332 in a central position. The upper stem 332 is provided with a seal or flange 334 and a pin 336, the flange 334 limiting the downward travel of the upper stem 332. Stem 332 is held in its downward position, as illustrated in Fig. 3, by means of a spring 338, the lower end of which rests against flange 334 while its upper end presses against the upper end of nipple 340.

The lower end of nipple 340 is threaded into the nipple 312, while its upper end is threaded into the nipple 362. The nipple 312 is provided with a plurality of radial recesses 342 and 344 which permits the escape of gases between flange 334 and nipple 312 when the stem 332 is held in its downward position by spring 338. The recess 330 in the cylindrical stem 318 normally forms a press-fitted connection with the pin 336 so that the cylinder 316 and its stem 318 are held in a suspended position by stem 332, in the manner illustrated in Fig. 3.

The strength of spring 338 is so proportioned that it normally holds the cylinder 316, its stem 318, and the O ring 322 in the open position illustrated in Fig. 3 until the pressure in the boiler 10 reaches approximately 14 lbs. per square inch. When the boiler pressure increases beyond 14 lbs. per square inch, the O ring valve, which includes cylinder 316, stem 318, stem 332 and spring 338 travels in the upward direction with the result that the O ring 322 engages its seat 324, closing the valve.

The operation of the vent valve 35, accordingly, is as follows: Normally the valve is closed by the ball 306 which rests against its seat 303. Ball 306 is held in its downward position against seat 303 by means of spring 308. The valve remains closed until the boiler pressure reaches approximately 6 lbs. per square inch. When the boiler pressure rises above 6 lbs. per square inch, it raises ball 306 against the pressure exerted by spring 308 with the result that the valve is opened and gases, especially the trapped air, escape through the vent valve along a path through bore 311, past ball 306, through nipple 310, through the cylindrical chamber 314 in the nipple 312, past stem 318, through the recesses 342 and 344 and under the flange 334 and then finally through the recesses 350 and 352 provided in the nipples 340 and 362.

The amount of clearance provided in the chamber 314 between cylinder 316 and cylindrical wall 326 and between stem 318 and cylindrical wall 328 is such that when the boiler pressure rises to 14 lbs. per square inch, this clearance is insufficient to discharge gases from the boiler at a sufficiently rapid rate so as to keep the boiler pressure below 14 lbs. Accordingly, the pressure generated within the boiler is sufficient to raise cylinder 316 and stem 318 in the upward direction against the downward pressure of spring 338 with the result that the O ring 322 seats itself against its seat 324, thus closing the valve, and keeping it closed as long as the pressure within the boiler remains higher than 14 lbs. per square inch.

Accordingly, the operation of the valve may be summarized as follows: The valve remains closed until the boiler pressure rises up to 6 lbs. per square inch, and then it opens and remains open until the boiler pressure rises up to 14 lbs. per square inch, at which time it closes and remains closed so long as the boiler pressure is higher than 14 lbs. per square inch. Should the boiler pressure drop below 14 lbs. per square inch, as when the water cools, spring 338 at once pushes stem 332 and cylinder 316 downwardly with the result that the O ring 322 disengages its seat 324 and the valve opens permitting steam to escape until the pressure in the steam chamber above said water falls below 6 lbs. per square inch.

To prepare the steam generator for operation, water is introduced into the vessel 10 through the filler tube 15. Eventually, the level of the water W rises to a point where it closes the filler tube 15 to seal the lower end of the filler tube and to trap air in the upper end of the vessel and to prevent introduction of additional water. By setting the spring 308 to maintain the valve 35 closed below 6 lbs. per square inch the danger of the water being introduced into the vessel substantially above the bottom of the filler pipe is precluded. A vapor chamber 24 is thus formed in the upper end of the vessel 10. The filling of the vessel to the level L is indicated to the user by accumulation of water in the filler tube 15. When sufficient water has been added, the cap 16 is screwed onto the upper end of the filler tube 15.

The electric heating elements 19 are now energized by closing the switch 21. As the temperature of the water and trapped air rises, the pressure of the trapped air within the space or chamber 24 increases. Due to the rising temperature within the vessel, the vapor in the chamber 24 is pressurized and discharges through the relief valve 35 forcing the trapped air out of the chamber. When the vapor pressure reaches 14 lbs. per square inch, the vent valve closes, trapping dry steam that is substantially free of air in the vapor space 24.

As heating of the water is continued, steam pressure is developed at a rapid rate and quickly reaches an operating pressure of approximately 95 lbs. per square inch, at which time the pressure switch 73 becomes energized and disconnects heater 19 from the source of power 25. If the pressure switch 73 fails to be energized due to some mechanical failure or accidental obstruction of its passage, the steam pressure will rise up to 100 lbs. per square inch, at which time the safety valve, or the poppet valve, 36 will open and will remain open so long as the boiler pressure is of the order of 100 lbs. per square inch. The heating elements 19 operate to maintain the 100 lb. pressure, the thermostat 23 being set at 345° F., corresponding to 112 lbs. per square inch vapor pressure. Should the steam pressure reach 100 lbs. per square inch, in the event of failure of the pressure switch, the safety valve 36 will open to relieve this pressure. The thermostat operates to open the circuit 20 only if the temperature of any gas in the vapor chamber reaches an unexpectedly high value. This may occur for example if no or little water vapor is present and the amount of residual air present is too small to attain a pressure of 100 lbs. per square inch.

The steam available within the vessel or boiler 10 is employed for cleaning various articles, such as refrigerators, typewriters and other devices. To clean the article, the nozzle 54 is opened to cause the steam to be emitted through the nozzle 55. Ordinarily the nozzle is not opened until after the pressure has attained its equilibrium value of 95 lbs. per square inch. However, it may be opened to supply steam for cleaning purposes at a much lower pressure such as about 70 lbs. per square inch.

When the nozzle 54 is opened, the pressure within the upper portion of the discharge pipe 43, above the water level L, is partially relieved, steam entering this pipe through the upper orifice or orifices 47. The excess pressure within the chamber 24 also forces water into the pipe 43 through the bottom orifice or orifices 46 thus causing the column of water in the discharge pipe to rise therein.

Initially at least, when the nozzle is opened the water in this column tends to boil because of the fact that the pressure in the standpipe is lower than the pressure in the vapor space. But in any event the dry steam entering the upper orifice agitates and aspirates water at the top of the column, in effect "atomizing" it and forming wet steam in the standpipe 43 and hose 53.

The rate of influx of steam from the vapor space 24 into the interior of the discharge pipe 43 is determined by the size and number of the upper holes 47. Likewise, the rate of influx of water to the interior of the pipe 43 is determined by the size and number of the lower holes 46. As a result of the co-action of the upper and lower perforations 47 and 46 partially saturated or wet steam enters the discharge pipe and is expelled through the nozzle 54 when the nozzle is opened.

If the lower end of the discharge pipe were to terminate above the water level L, dry steam would be produced and if the pipe were provided only with the lower perforations 46, then very wet steam would be produced. By employing two sets of perforations, one above and one below the water level, partially saturated steam is produced. The perforations 47, 46 may have diameters of approximately 1/16 inch. In order to adjust the steam generator to produce steam having different degrees of saturation, interchangeable discharge pipes having a greater or lesser number of perforations 47 and 46, or both, and of varying sizes, may be substituted for the pipe 43 illustrated in the drawing.

One advantage of using pressure switch 73 resides in the fact that it eliminates the operation of the poppet valve 36 in normal operation, thus eliminating annoyance to the operators because of the noise it makes and also eliminating needless discharge of steam. The setting of the pressure switch is adjusted to take into consideration the thermal, or calorific, inertia of the overall system including the heaters and the boiler. In the disclosed system, with the heaters each having 800 watt capacity and the boiler having approximately 2 gallon capacity, operation of the poppet valve 32 can be eliminated altogether if the pressure switch 73 is set to open contacts 74 at approximately 95 lbs. per square inch and to reclose them at approximately 90 lbs. per square inch.

It is thus seen that the present steam generator is highly practical and efficient in use. The generator is of a portable type, weighing approximately 45 lbs. when empty and about 63 lbs. when containing a full supply of water. By controlling the degree of saturation of the steam, the device can be used for cleaning various types of objects. The generator is designed to attain equilibrium rapidly and to produce steam at a rapid rate and to effectively maintain the pressure at a suitable high value.

In accordance with the provisions of the patent statutes, I have described the principle of the invention, together with the construction of the steam generator which I now consider to represent the best embodiment thereof. I wish to have it understood, however, that the invention may be embodied in other forms within the scope of the appended claims.

I claim:

1. In a steam generator including a boiler normally partially filled with water and having a steam chamber over said water, a valved nozzle connected to the boiler by means of a hose for releasing steam therefrom at will, an electric heating element connected to said boiler for heating said water, a pressure switch arranged to be operated by pressure of gas in said chamber, a pair of electrical contacts connected in series with said heating element and operated by said pressure switch for disconnecting said heating element when gas in said chamber attains a predetermined pressure, and a safety valve connected to said chamber and adapted to open at pressure above said predetermined pressure.

2. In a steam generator including a boiler normally partially filled with water and having a steam chamber over said water, a valved nozzle connected to the boiler by means of a hose for releasing steam therefrom at will, an electric heating element connected to said boiler for heating said water, a thermostat connected to said boiler and mounted within said chamber, said thermostat having a switch connected in series with said heating element, said thermostat being responsive to temperature of fluid within said chamber, and a pressure switch arranged to be operated by pressure of gas in said chamber, said pressure switch having a first pair of electrical contacts connected in series with said heating element for disconnecting said heating element when the pressure of gas in said chamber attains a predetermined pressure and for reconnecting said heating element when gas in said chamber falls below a predetermined pressure, said thermostat having a second pair of electrical contacts connected in series with said heating element for disconnecting said heating element when the temperature of gas in said chamber attains a predetermined temperature.

3. In a steam generator including a boiler normally partially filled with water and having a steam chamber above said water, a valved nozzle connected to the boiler by means of a hose for releasing steam therefrom at will, a filler pipe having an opening within said boiler near the upper end thereof, a vent valve connected to said boiler and opening into the upper portion of said chamber, said vent valve having a first pressure actuated valve opening at a first pressure several pounds above the atmosphere pressure, and a second pressure actuated valve in series with the first valve, said second valve remaining open until that second pressure which is several pounds higher than the first pressure is attained, whereby said first valve opens first, and said second valve closes only when steam within said steam chamber reaches said second pressure.

4. In a steam generator including a vessel for containing water, electrical heating element connected to said vessel for heating said water, a valved nozzle connected to the boiler by means of a hose for releasing steam therefrom at will, an electrical circuit for said elements, said circuit including a thermostat element including a switch connected in said circuits for opening and closing said circuits, said thermostat element being responsive to the temperature of fluid within said vessel, a pressure switch connected to said vessel, said pressure switch having contacts connected with said circuit for opening said circuit only when pressure within said vessel reaches a predetermined value, a filler pipe having an opening within said vessel near the upper end thereof, and a vent valve connected to said boiler, said vent valve having first and second valves in series with each other, said first valve being connected directly to said vessel and said second valve being connected to the outer end of said first valve, whereby said first valve discharges fluid from said vessel into said second valve, said first valve having means for normally maintaining said first valve closed at atmosphere pressure and for opening said first valve at a first pressure several pounds above said atmosphere pressure, and said second valve having means for keeping said second valve normally open until pressure within said vessel reaches a second pressure which is several pounds higher than the first pressure.

5. In a steam generator including a boiler normally partially filled with water and having a steam chamber above said water, a valved nozzle connected to the boiler by means of a hose for releasing steam therefrom at will, an electric heating element connected to said boiler for heating said water, a thermostat connected to said boiler and mounted within said chamber, said thermostat having a switch connected in series with said heating element, said thermostat being responsive to the temperature of the fluid within said chamber, a pressure switch connected to said chamber and being responsive to the pressure of the fluid within said chamber, and a pair of electrical contacts connected in series with said heating element and said switch for disconnecting said heating element when the pressure of fluid in said chamber attains a predetermined value and for reconnecting said heating element when the pressure of fluid in said chamber falls below a predetermined value.

6. In a steam generator including a boiler normally filled with water and having a steam chamber above said water, a valved nozzle connected to the boiler by means of a hose for releasing steam therefrom at will, a filler pipe having an opening within said boiler near the upper end thereof, a vent valve connected to said chamber, said vent valve having a first pressure actuated valve, said valve opening at a first fluid pressure within said chamber, said first pressure being several pounds above atmospheric pressure, and a second pressure actuated valve in series with said first valve, said second valve being mounted in series with said first valve, said second valve remaining open until a second fluid pressure is reached within said chamber, said second pressure being several pounds higher than the first pressure, whereby said first valve opens first and said second valve closes only when the fluid within said steam chamber reaches said second pressure.

7. A steam generator including a boiler normally partially filled with water and having a steam chamber above said water, a valved nozzle connected to the boiler by means of a hose for releasing steam therefrom at will, a filler pipe having an opening within said boiler near the upper end thereof, a vent valve connected to said boiler and opening into the upper portion of said chamber, said vent valve having a first pressure actuated valve opening at a first pressure several pounds above atmospheric pressure, said first valve including a ball, a seat and a spring holding said ball against said seat until the pressure exerted on said ball is equal to said first pressure, and a second pressure actuated valve in series with first valves, said second valve including a cylinder, a piston mounted within said cylinder, an O ring mounted on said piston, and a spring for holding said cylinder and said O ring in open position with respect to said cylinder whereby said second valve remains open until the pressure within said vessel reaches a second pressure which is several pounds higher than the first pressure.

8. A steam generator including a vessel for containing water, electrical heating element connected to said vessel for heating said water, a valved nozzle connected to the boiler by means of a hose for releasing steam therefrom at will, an electrical circuit for the said heating element, a thermostat element including a switch connected in said circuit, a pressure responsive element connected to said vessel, said pressure responsive element being actuated by fluid pressure within said vessel, a pair of electrical contacts mounted on and being operated by said pressure responsive element, said contacts being connected in series with said heating element, a filler pipe having an opening within said vessel near the upper end thereof, and a vent valve connected to said vessel, said vent valve having first means for normally keeping said vessel closed until the fluid pressure within said vessel rises several pounds above atmospheric pressure, and a second means connected in series with said first means, said second means being normally open, said second means having additional means for closing said second means when the fluid pressure within said vessel reaches a second pressure which is higher than the first pressure.

References Cited in the file of this patent

UNITED STATES PATENTS

| | | |
|---|---|---|
| 1,437,119 | Speck | Nov. 28, 1922 |
| 1,821,189 | Meinken et al. | Sept. 1, 1931 |
| 2,060,638 | Schlosser | Nov. 10, 1936 |
| 2,098,129 | Bell | Nov. 2, 1937 |
| 2,627,015 | Hackman | Jan. 27, 1953 |

FOREIGN PATENTS

| | | |
|---|---|---|
| 271,525 | Great Britain | Sept. 24, 1928 |